US006886579B2

(12) United States Patent
Stein et al.

(10) Patent No.: US 6,886,579 B2
(45) Date of Patent: May 3, 2005

(54) VENT CAP (75) Inventors: William Stein, West Lafayette, IN (US); Don Bower, West Lafayette, IN (US)

(73) Assignee: Swift Enterprises, Ltd., Chicago, IL (US)

( * ) Notice: Subject to any disclaimer, the term of this patent is extended or adjusted under 35 U.S.C. 154(b) by 26 days.

(21) Appl. No.: 10/376,300

(22) Filed: Mar. 3, 2003

(65) Prior Publication Data

US 2004/0173258 A1 Sep. 9, 2004

(51) Int. Cl.$^7$ ................................................. F16K 17/36
(52) U.S. Cl. ........................ 137/39; 137/43; 137/68.19; 137/599.16; 429/85
(58) Field of Search .................... 137/38, 39, 43, 137/68.19, 599.01, 599.16; 220/202, 203.19, 203.28; 429/84, 85

(56) References Cited

U.S. PATENT DOCUMENTS

| 1,260,739 | A | * | 3/1918 | Yeamans | 137/38 |
|---|---|---|---|---|---|
| 1,363,263 | A | * | 12/1920 | Ohliger et al. | 429/85 |
| 2,113,454 | A | * | 4/1938 | Mitchell | 429/84 |
| 2,273,737 | A | * | 2/1942 | Snyder | 137/39 |
| 2,869,563 | A | * | 1/1959 | Schoengrun | 137/43 |
| 3,351,497 | A | * | 11/1967 | Lucas | 429/85 |
| 3,610,263 | A | * | 10/1971 | Walters | 137/43 |
| 3,738,384 | A | * | 6/1973 | Hall | 137/43 |
| 3,994,360 | A | * | 11/1976 | Leibold | 137/38 |
| 4,299,247 | A | * | 11/1981 | Keller | 137/43 |
| 4,846,208 | A | * | 7/1989 | Hempel et al. | 137/43 |
| 6,622,760 | B2 | * | 9/2003 | Peattie | 141/224 |

FOREIGN PATENT DOCUMENTS

| FR | 544427 A1 | * | 9/1922 | | 137/43 |

OTHER PUBLICATIONS

Translation of FR544427A1.*

* cited by examiner

Primary Examiner—John Rivell
(74) Attorney, Agent, or Firm—Townsend & Banta (57) ABSTRACT

A vent cap is provided for releasing gas from containers, while preventing spillage of the contents therein when the container is tipped from a vertical position. The vent cap has a ball bearing mounted in a ball bearing containment chamber on the top thereof which, when the container is in an upright vertical position, allows release of gases from the container but, when the container is tipped, allows a piston disposed within the vent cap to close off gas release ducts formed in the vent cap, thus effectively preventing spillage of the containers contents.

13 Claims, 6 Drawing Sheets

VENT CAP

FIELD OF THE INVENTION

The present invention provides a vent cap for releasing gas from containers, while preventing spillage of the contents therein when the container is tipped from a vertical position. In particular, the present invention provides a vent cap having a ball bearing mounted in a ball bearing containment chamber on the top thereof which, when the container is in the proper vertical position, allows release of gases from the container, but when the container upon which the vent cap is mounted is tipped, allows a piston to close off gas release ducts formed in the vent cap to prevent spillage of the containers contents.

BACKGROUND OF THE INVENTION

In industrial facilities, research laboratories and educational environments, chemicals are frequently stored. Many of these chemicals produce, or may produce, gases, if the chemicals form a vapor naturally or if they unexpectedly react with another reagent. If these gases are not released, over pressurization of the container may lead to explosion of the container caused by gas build-up therein. Thus, release of gas build-up in chemical storage vessels is necessary to maintain safe storage of chemical agents.

Conventionally, the pressure in such containers is checked periodically, and the caps thereof loosened to release any pressure. Caps/valves have been previously provided, which allow for release of gas and/or fluids. However, such caps/valves differ from the present invention in various respects.

For example, U.S. Pat. No. 4,640,304 provides an overflow vent valve. Unlike the present invention, the overflow vent valve of the '304 patent is used inside of a pipe, to vent gases there from. To do so, a lightweight ball is employed that floats on the liquid inside the pipeline, which is prevent the liquid from exiting the pipeline. However, if such a valve were employed in a movable apparatus such as a container, it would fail to prevent spillage there from when the container was tilted from the vertical position.

It is an object of the present invention to provide an improved vent cap for containers housing volatile liquids. In particular, it is an object of the present invention to provide a vent cap that allows built up gases within the container to vent, while also automatically sealing the container upon tipping thereof. Such a vent cap will allow gases to be vented while a container is upright, while preventing spillage of liquids there from if the container is tipped from its upright position.

It is a further object of the present invention to provide such a vent cap as described above with a back up venting system so that, if the main venting system becomes inoperable, or if the container is tipped and, simultaneously gas pressure increases to a dangerous level, the gases may be vented. This will allow some spillage of volatile liquids, but avoid the less desirable explosion.

SUMMARY OF THE INVENTION

In order to achieve the above objects of the present invention, the present inventors diligently endeavored to design a vent cap meeting the standards set forth above. As a result of their inventive endeavors, the following embodiments of the present invention are provided as follows:

In a first embodiment of the present invention, a vent cap is provided comprising:

a main housing having a bottom surface, a concave top surface, an outer circumference and an interior portion;

a cap cover having one or more perforations formed there through, disposed upon the top surface of the main housing, so as to form a ball bearing containment chamber defined by the concave top surface and the cap cover;

a chamber disposed within the interior portion of the main housing, said chamber having an upper surface and an outer circumference;

a container attachment means provided adjacent the outer circumference of said chamber, opposite the upper surface thereof, one or more sealing spring mounts disposed within said chamber, adjacent the outer circumference thereof;

a piston chamber disposed within said interior portion of said main housing, extending from the upper surface of said chamber to the top surface of said main housing;

one or more gas release ducts disposed within said interior portion of said main housing, extending from the upper surface of said chamber to the top surface of said main housing;

a piston having a head and a base, said head having a first end adjacent said base and a second proximal end, said piston being movably disposed within said piston chamber;

a sealing spring disposed within said chamber having a first end and a second end, said first end being attached to one or more of said sealing spring mounts and the second end being attached to the base of said piston; and a ball bearing rollably disposed within said ball bearing containment chamber.

In a second embodiment of the present invention, a vent cap is provided according to the first embodiment above, further comprising:

one or more burst disc gas release ducts, each of said burst disc gas release ducts having a first mouth disposed adjacent the outer circumference of said main housing, a second mouth disposed adjacent the outer circumference of said chamber, and a duct passage formed there between, and one or more burst discs removably and replaceably mounted in each of said gas release ducts.

In a third embodiment of the present invention, a vent cap is provided according to the second embodiment above, wherein the first mouth of said gas release ducts further comprises a burst disc retainer means.

In a fourth embodiment of the present invention, a vent cap is provided according to the second embodiment above, wherein the second mouth of said gas release ducts further comprises a burst disc retainer means.

In a fifth embodiment of the present invention, a vent cap is provided according to the first embodiment above, wherein said piston further comprises a gas release passage formed therein, extending from the base of said piston to the second proximal end of the base, and one or more discs disposed within said gas release passage of said piston.

In a sixth embodiment of the present invention, a vent cap is provided according to the fifth embodiment above, wherein the gas release duct further comprises a burst disc retainer means.

In a seventh embodiment of the present invention, a vent cap is provided according to the first embodiment above, wherein the container attachment means comprises threads formed in the outer circumference of the chamber for threadably attaching the threads of said vent cap to threads formed on a neck of a container.

In an eighth embodiment of the present invention, a vent cap is provided according to the first embodiment above, wherein the container attachment means comprises a rubber ring mounted upon the outer circumference of the chamber, said rubber ring capable of securedly attaching the vent cap to a neck of a container when mounted there around.

In a ninth embodiment of the present invention, a vent cap is provided comprising:

a main housing having a bottom surface, a concave top surface, an outer circumference and an interior portion;
   a cap cover having perforations there through, disposed upon the top surface of the main housing, so as to form a ball bearing containment chamber defined by the concave top surface and the cap cover;
   a chamber disposed within the interior portion of the main housing, said chamber having a upper surface and an outer circumference having threads formed therein;
   a piston chamber having an interior diameter disposed within said interior portion of said main housing, extending from the upper surface of said chamber to the top surface of said main housing;
   a piston having a head, a base and a base diameter smaller than the piston chamber interior diameter, said piston movably disposed within said piston chamber;
   a spring and E-clip disposed within said chamber, said spring having a first end and a second end, said first end of said spring being removably disposed against said E-clip and the second end being removably disposed against the base of said piston, said E-clip being removably retained by the threads of said chamber; and
   a ball bearing rollably disposed within said ball bearing containment chamber.
   wherein said piston chamber further acts as a gas release duct, so as to allow gases formed within a container upon which the vent cap is placed to escape from the interior portion of said main housing to the top surface of said main housing and through said cap cover.

In a tenth embodiment of the present invention, a vent cap is provided according to the ninth embodiment above, wherein the spring is a tapered spring having a first end diameter equal to or less than the interior diameter of the chamber, and a second diameter equal to or less than the piston base diameter.

In an eleventh embodiment of the present invention, a vent cap is provided according to the ninth embodiment above, further comprising:

one or more burst disc gas release ducts, each of said burst disc gas release ducts having a first mouth disposed adjacent the outer circumference of said main housing, a second mouth disposed adjacent the outer circumference of said chamber, and a duct passage formed there between, and
   one or more burst discs removably and replaceably mounted in each of said gas release ducts.

In a twelfth embodiment of the present invention, a vent cap is provided according to the tenth embodiment above, wherein the first mouth of said gas release ducts further comprises a burst disc retainer means.

In a thirteenth embodiment of the present invention, a vent cap is provided according to the tenth embodiment above, wherein the second mouth of said gas release ducts further comprises a burst disc retainer means.

In a fourteenth embodiment of the present invention, a vent cap is provided according to the ninth embodiment above, wherein said piston further comprises a gas release passage formed therein, extending from the base of said piston to the second proximal end of the base, and one or more discs disposed within said gas release passage of said piston.

In a fifteenth embodiment of the present invention, a vent cap is provided according to the fourteenth embodiment above, wherein the gas release duct further comprises a burst disc retainer means.

DETAILED DESCRIPTION OF THE INVENTION

Figure 1:
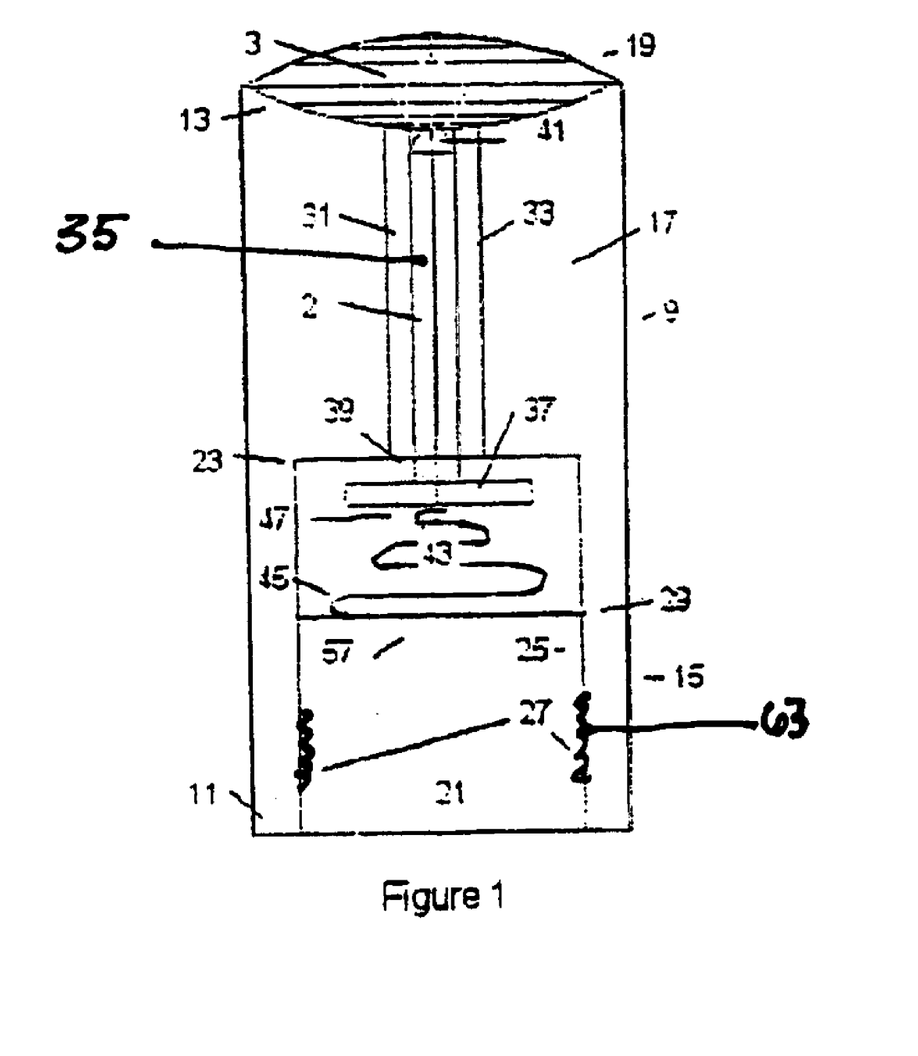
FIG. 1 is a side view cut away of the vent cap of the first embodiment of the present invention, wherein the ball bearing is positioned so as to depress the piston and thus allow for release of gases from a container.

The vent cap of the present invention, as illustrated in FIG. 1, is comprised of a main housing 9 having a bottom surface 11, a concave top surface 13, an outer circumference 15 and an interior portion 17. A cap cover 19 having one or more perforations there through is disposed upon the top surface 13 of the main housing 9, so as to form a ball bearing containment chamber defined by the concave top surface 13 and the cap cover 19.

The interior portion 17 of the main housing 9 defines a chamber 21 having an upper surface 23 and an outer circumference 25. A container attachment means 27 is provided adjacent the outer circumference 25 of the chamber 21, opposite the upper surface 23 thereof. Such container attachment means 27 may be in the form of threads formed in the outer circumference 25 of the chamber 21, as shown in FIG. 1, for threadably attaching the threads of the vent cap to threads formed on a neck of a container. Alternatively, the container attachment means 27 may be in the form of a rubber ring or friction material mounted upon the outer circumference 25 of the chamber 21. When using a rubber ring or friction material as the container attachment means, such a rubber ring or friction material should fit securely against the outer circumference 25 of the chamber 21, and be capable of securely attaching the vent cap to a neck of a container when mounted there around by frictional and/or compressive force.

A piston chamber 31 is disposed within the interior portion 17 of the main housing 9, so as to extend from the upper surface 23 of the chamber 21 to the top surface 13 of the main housing 9. Further, one or more gas release ducts 33 are disposed within the interior portion 17 of the main housing 9, so as to extend from the upper surface 23 of the chamber 21 to the top surface 13 of the main housing 9. A piston 2 is movably disposed within the piston chamber 31. The piston 2 is comprised of a head 35 and a base 37, the head 35 having a first end 39 adjacent the base 37 and a second proximal end 41.

As illustrated in FIGS. 1, 2, 4 and 5, the piston chamber 31 may itself define the gas release duct 33. However, alternatively or in addition to such disposition, gas release ducts may be formed adjacent to the piston chamber 33, such that a piston 2 disposed therein may seal the gas release ducts when said piston 2 is not depressed.

One or more sealing spring mounts 29 are disposed within the chamber 21, adjacent the outer circumference 25 thereof. A sealing spring 43 is disposed within the chamber 21. The sealing spring has a first end 45 attached to or disposed against the sealing spring mounts 29, and a second end 47 attached to or disposed against the base 37 of the piston 2, such that the sealing spring is securely retained within the chamber 21.

Figure 6:
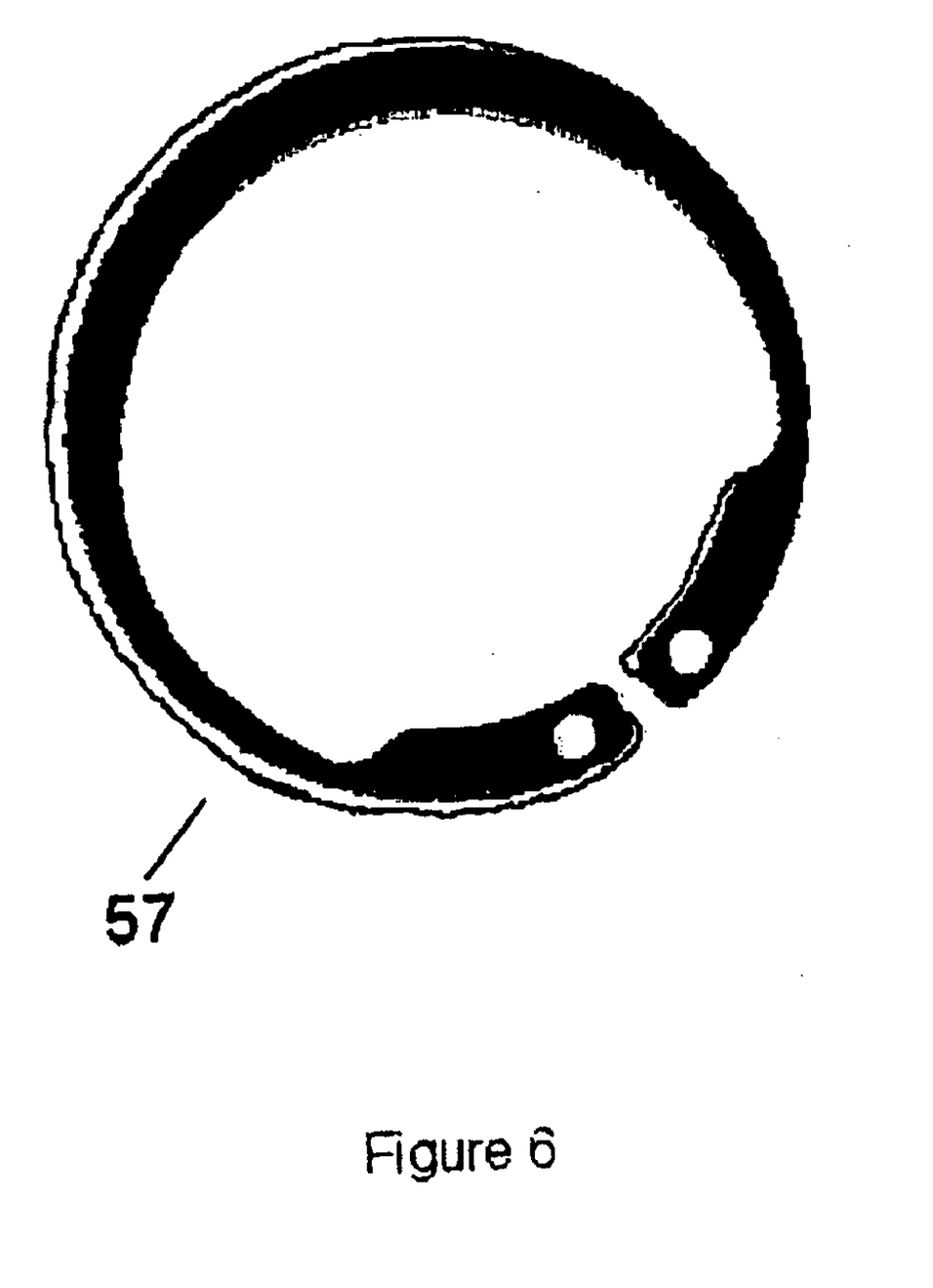
FIG. 6 is a perspective view of an E-clip of the present invention.

In a preferred embodiment, as illustrated in FIG. 6, the sealing spring mounts 29 are replaced with an E-clip 57. This E-clip 57 is disposed and removably retained in the chamber 21 by the threads formed therein, or by compressive retention by a rubber ring or friction material. In such an embodiment, the first end 45 of the sealing spring 43 is removably disposed against the E-clip 57 and the second end 47 of the sealing spring 43 is removably disposed against the base 37 of the piston 2.

When using an E-clip 57, use of a tapered spring is preferred, wherein the tapered spring has a first end diameter equal to or less than the interior diameter of the chamber, and a second diameter equal to or less than the piston base diameter. The combination of E-clip and tapered spring allows for easy construction and replacement, as the E-clip can be easily screwed in to the threads or popped into the ring or friction material, and the spring may be easily removed and replaced if fatigued or damaged.

A ball bearing 3 is rollably disposed within the ball bearing containment chamber, such that when the vent cap is in a vertical upright position, the ball bearing 3 rests at the lowest point of the concave top surface 13 of the main housing 9. The size and weight of the ball bearing 3 is dependent upon the size of the sealing spring 43, i.e., the ball bearing 3 must be of sufficient weight to depress the sealing spring 43 when resting thereupon. Thus, selection of the appropriate ball bearing 3 is based upon spring force.

When the ball bearing 3 rests at the lowest point of the concave top surface 13 (at or about in the center thereof), the ball bearing 3 rests upon and depresses the piston 2. Such depression of the piston 2 acts to expose the gas release ducts 33, i.e., uncovers them to allow a free air/gas flow there through. Therefore, when the vent cap of the present invention is fitted upon a container, the container is open to the environment, allowing gases contained or formed in the container to be safely released and explosion or bursting of the container prevented.

Figure 2:
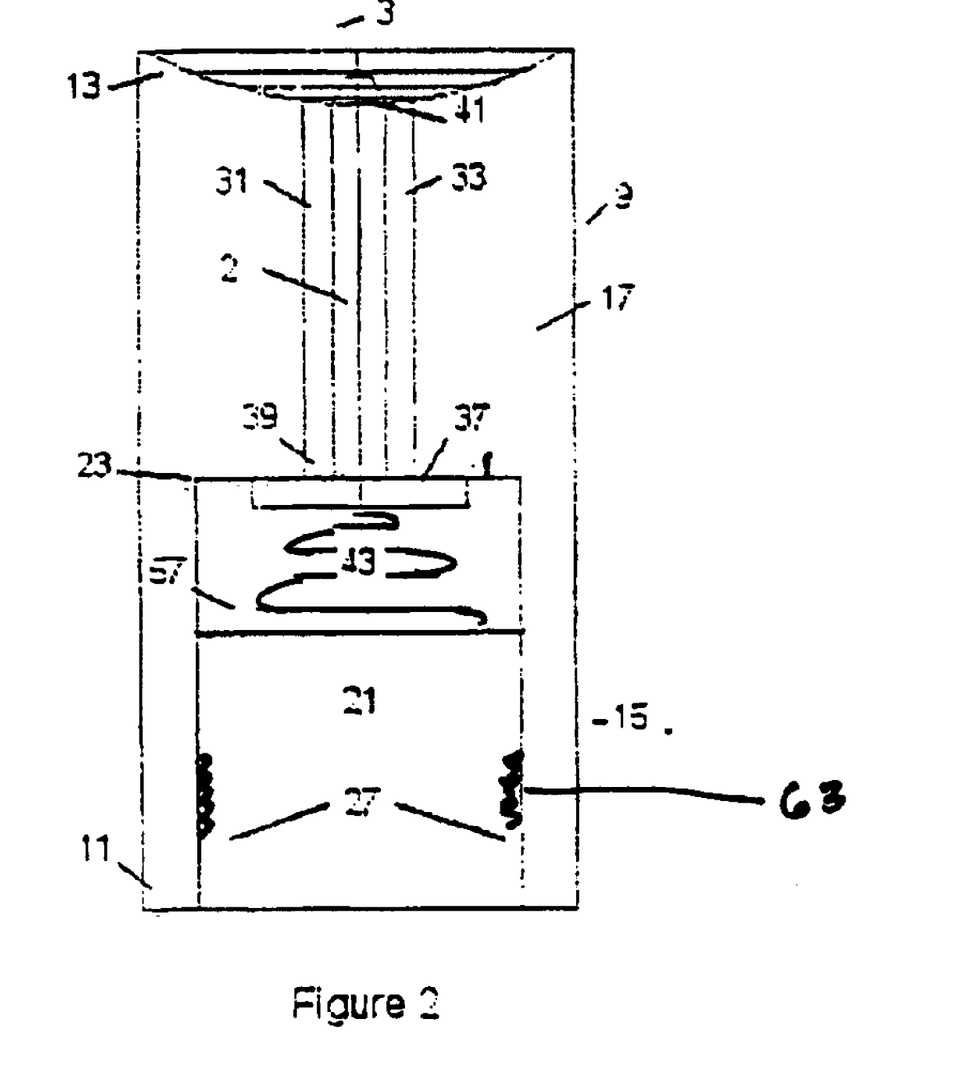
FIG. 2 is a side view cut away of the vent cap of the first embodiment of the present invention, wherein the ball bearing is positioned so as to allow the piston to seal the gas release ducts.
Figure 3:
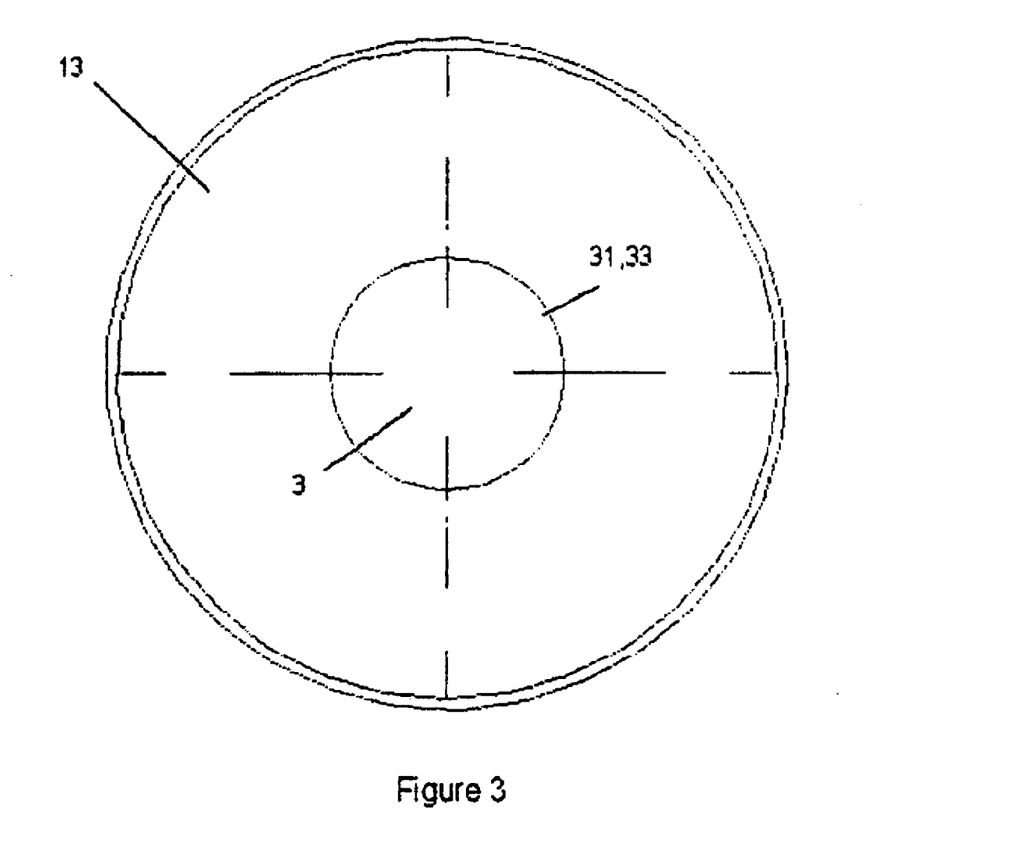
FIG. 3 is a top view of the vent cap of the first embodiment of the present invention, wherein the cap cover is omitted to illustrate the location of the ball bearing in the ball bearing containment chamber when the container is in a vertical position (i.e., when the gas release ducts are open so as to allow release of any gases from within the container).

However, as shown in FIG. 2, when the container having the vent cap of the present invention thereon is tipped over (displaced from the vertical position), gravity causes the ball bearing 3 to travel to a non-central area of the concave top surface 13, i.e., to roll away from the lowest point of the concave top surface 13. This movement of the ball bearing 3 allows the piston 2 to move into the non-depressed or upright position, as shown in FIG. 2, thus sealing the gas release ducts and preventing spillage of the container contents.

Figure 4:
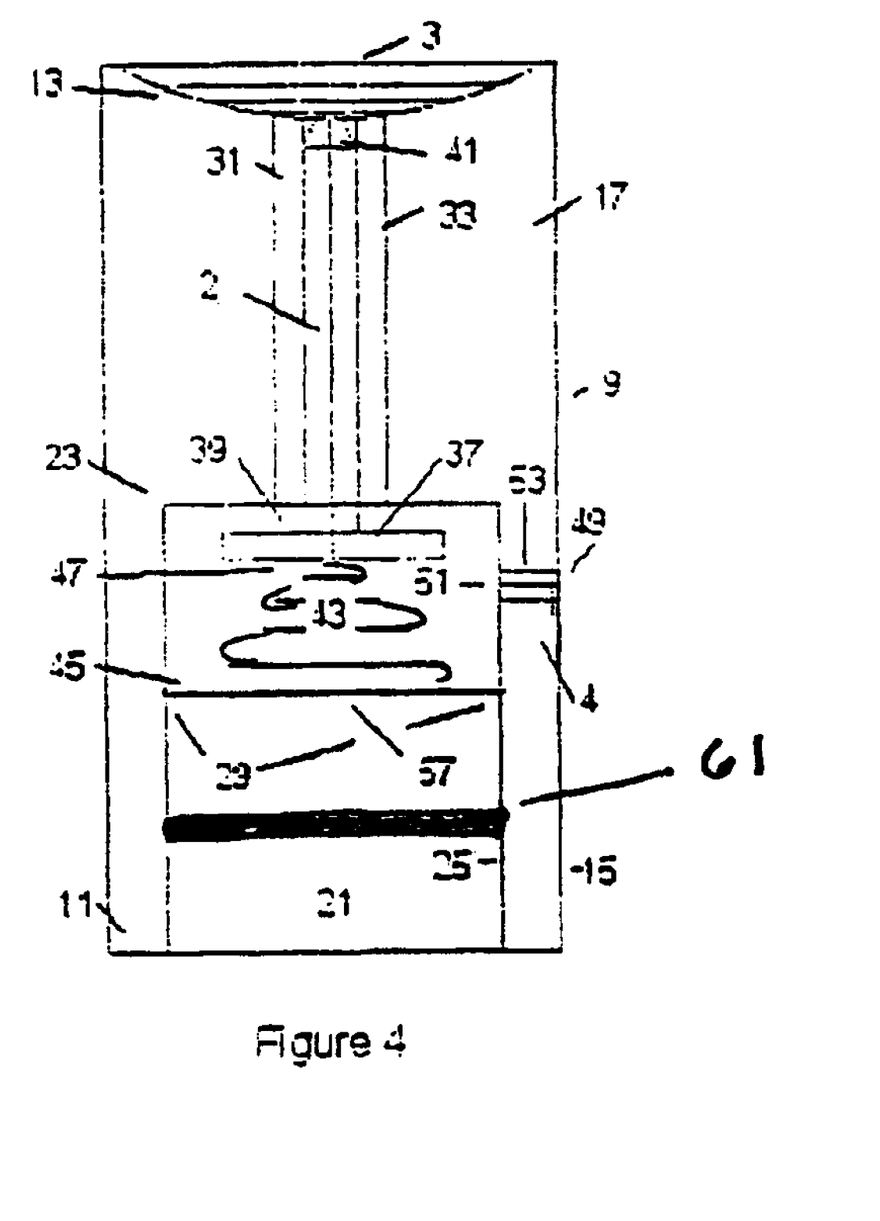
FIG. 4 is a side view cut away of the vent cap of the present invention, illustrating the vent cap with burst discs disposed within the chamber of the main housing.
Figure 5:
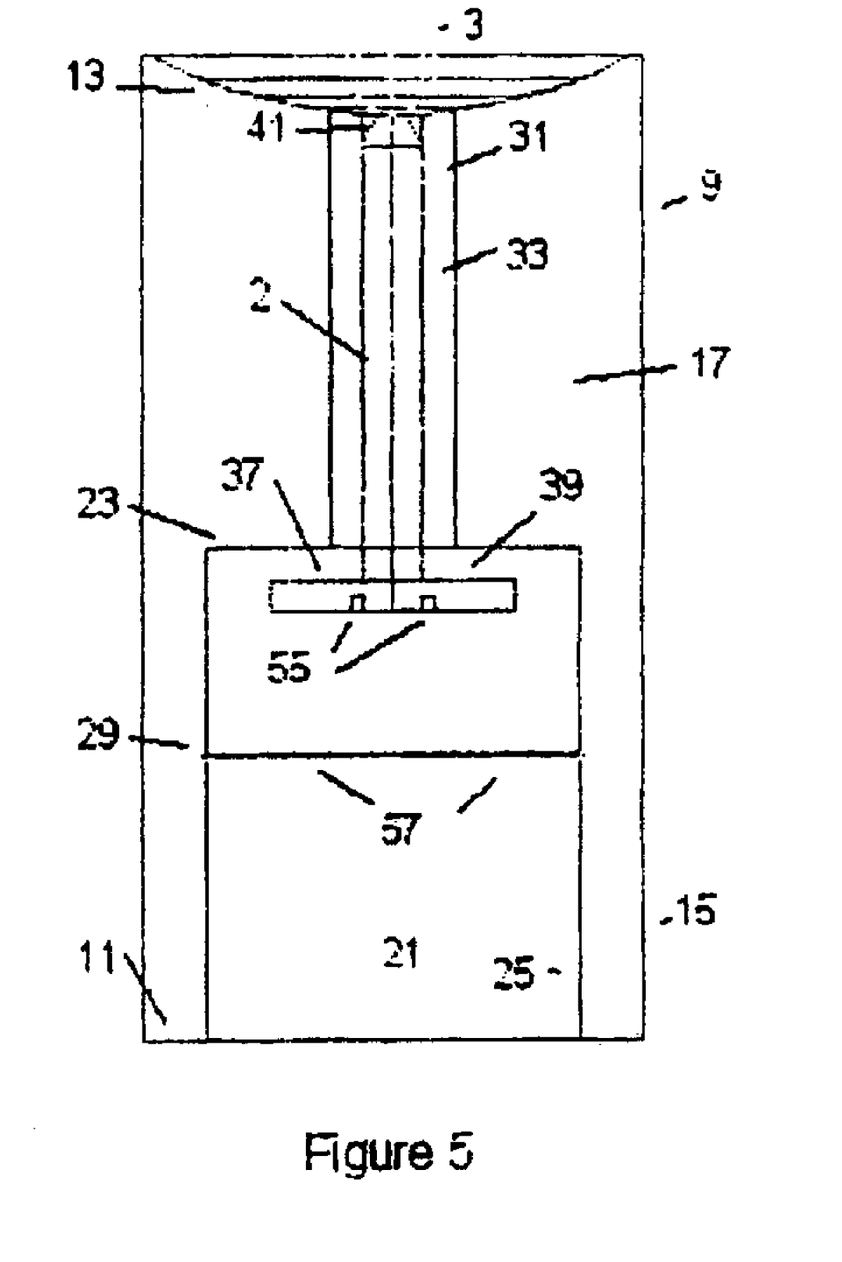
FIG. 5 is a side view cut away of the vent cap of the present invention, illustrating the vent cap with burst discs disposed in the base of the piston.

In a further embodiment of the present invention, one or more burst disc gas release ducts 4 is formed in the outer circumference 15 of the main housing 9, so as to relieve pressure and avoid container explosion or bursting in case of piston malfunction or in instances in which the container is tipped over and gas pressure within the container builds to a dangerously high level. Each of the burst disc gas release ducts 4 has a first mouth 49 disposed adjacent the outer circumference 15 of the main housing 9, a second mouth 51 disposed adjacent the outer circumference 25 of the chamber 21, and a duct passage 53 formed there between. One or more burst discs are mounted, and secured by a burst disc retainer means, in the burst disc gas release duct 4, and may be removed and replaceably mounted therein after bursting or for maintenance purposes. Burst disc retainer means may include, but are not limited to, slots, retainers and clips, which provide an airtight seal when the burst disc is place in the burst disc gas release duct 4.

Alternatively or in addition to providing burst discs in a burst disc gas release duct as described above, as illustrated in FIG. 5, the piston 2 may further comprise a gas release passage 55 formed therein, extending from the base 37 of the piston 2 to the second proximal end 41 of the piston 2. One or more burst discs are disposed within the gas release passage 55 of the piston 2, which burst and release excessive gas pressure when the container is tipped from vertical and has developed a dangerously high gas pressure within.

The above embodiments of the present invention provide a safe and reliable method and apparatus of storing volatile liquids. Further, the construction of the vent cap of the present invention is economical, and allows for simple repair and replacement of individual components thereof.

What is claimed is:

1. A vent cap comprising:

a main housing having a bottom surface, a concave top surface, an outer circumference and an interior portion;

a cap cover having perforations there through, disposed upon the top surface of the main housing, so as to form a ball bearing containment chamber defined by the concave top surface and the cap cover;

a chamber disposed within the interior portion of the main housing, said chamber having a upper surface and an outer circumference;

a container attachment means provided adjacent the outer circumference of said chamber, opposite the upper surface thereof, one or more sealing spring mounts disposed within said chamber, adjacent the outer circumference thereof;

a piston chamber disposed within said interior portion of said main housing, extending from the upper surface of said chamber to the top surface of said main housing;

one or more gas release ducts disposed within said interior portion of said main housing, extending from the upper surface of said chamber to the top surface of said main housing;

a piston having a head and a base, said head having a first end adjacent said base and a second proximal end, said piston being movably disposed within said piston chamber;

a sealing spring disposed within said chamber having a first end and a second end, said first end being attached to one or more of said sealing spring mounts and the second end being attached to the base of said piston;

a ball bearing rollably disposed within said ball bearing containment chamber;

one or more burst disc gas release ducts, each of said burst disc gas release ducts having a first mouth disposed adjacent the outer circumference of said main housing, a second mouth disposed adjacent the outer circumference of said chamber, and a duct passage formed there between, and one or more burst discs removably and replaceably mounted in each of said gas release ducts.

2. The vent cap of claim 1, wherein the first mouth of said gas release ducts further comprises a burst disc retainer means.

3. The vent cap of claim 1, wherein the second mouth of said gas release ducts further comprises a burst disc retainer means.

4. The vent cap of claim 1, wherein said piston further comprises a gas release passage formed therein, extending from the base of said piston to the second proximal end of the base, and one or more discs disposed within said gas release passage of said piston.

5. The vent cap of claim 4, wherein the gas release duct further comprises a burst disc retainer means.

6. The vent cap of claim 1, wherein the container attachment means comprises threads formed in the outer circumference of the chamber for threadably attaching the threads of said vent cap to threads formed on a neck of a container.

7. The vent cap of claim 1, wherein the container attachment means comprises a rubber ring mounted upon the outer circumference of the chamber, said rubber ring capable of securely attaching the vent cap to a neck of a container when mounted there around.

8. The vent cap of claim 1, wherein the spring is a tapered spring having a first end diameter equal to or less than the interior diameter of the chamber, and a second diameter equal to or less than the piston base diameter.

9. A vent cap of claim 1, further comprising:

a main housing having a bottom surface, a concave top surface, an outer circumference and an interior portion;

a cap cover having perforations there through, disposed upon the top surface of the main housing so as to form a ball bearing containment chamber defined by the concave top surface and the cap cover;

a chamber disposed within the interior portion of the main housing, said chamber having a upper surface and an outer circumference having threads formed therein;

a piston chamber having an interior diameter disposed within said interior portion of said main housing, extending from the upper surface of said chamber to the top surface of said main housing;

a piston having a head, a base and a base diameter smaller than the piston chamber interior diameter, said piston movably disposed within said piston chamber;

a spring and E-clip disposed within said chamber, said spring having a first end and a second end, said first end of said spring being removably disposed against said E-clip and the second end being removably disposed against the base of said piston, said E-clip being removably retained by the threads of said chamber;

a ball bearing rollably disposed within said ball bearing containment chamber; and one or more burst disc gas release ducts, each of said burst disc gas release ducts having a first mouth disposed adjacent the outer circumference of said main housing, a second mouth disposed adjacent the outer circumference of said chamber, and a duct passage formed there between, and one or more burst discs removably and replaceably mounted in each of said gas release ducts.

10. The vent cap of claim 9, wherein the first mouth of said gas release ducts further comprises a burst disc retainer means.

11. The vent cap of claim 9, wherein the second mouth of said gas release ducts further comprises a burst disc retainer means.

12. A vent cap comprising:

a main housing having a bottom surface, a concave top surface, an outer circumference and an interior portion;

a cap cover having perforations there through, disposed upon the top surface of the main housing, so as to form a ball bearing containment chamber defined by the concave top surface and the cap cover;

a chamber disposed within the interior portion of the main housing, said chamber having a upper surface and an outer circumference having threads formed therein;

a piston chamber having an interior diameter disposed within said interior portion of said main housing, extending from the upper surface of said chamber to the top surface of said main housing;

a piston having a head, a base having a diameter smaller than the piston chamber interior diameter, and a gas release passage formed therein, extending from the base of said piston to a second proximal end of the base, said piston movably disposed within said piston chamber;

one or more discs disposed within said gas release passage of said piston;

a spring and E-clip disposed within said chamber, said spring having a first end and a second end, said first end of said spring being removably disposed against said E-clip and the second end being removably disposed against the base of said piston, said E-clip being removably retained by the threads of said chamber; and a ball bearing rollably disposed within said ball bearing containment chamber, wherein said piston chamber further acts as a gas release duct, so as to allow gases formed within a container upon which the vent cap is placed to escape from the interior portion of said main housing to the top surface of said main housing and through said cap cover.

13. The vent cap of claim 12, wherein the gas release duct further comprises a burst disc retainer means.

* * * * *